US009674510B2

(12) United States Patent
Aiden et al.

(10) Patent No.: US 9,674,510 B2
(45) Date of Patent: Jun. 6, 2017

(54) PULSED PROJECTION SYSTEM FOR 3D VIDEO

(71) Applicant: Elwha LLC, Bellevue, WA (US)

(72) Inventors: Erez L. Aiden, Cambridge, MA (US); Alistair K. Chan, Bainbridge Island, WA (US); Philip A. Eckhoff, Bellevue, WA (US); William Gates, Medina, WA (US); Peter L. Hagelstein, Carlisle, MA (US); Roderick A. Hyde, Redmond, WA (US); Jordin T. Kare, Seattle, WA (US); Robert Langer, Newton, MA (US); Eric C. Leuthardt, St Louis, MO (US); Nathan P. Myhrvold, Medina, WA (US); Michael Schnall-Levin, Cambridge, MA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 611 days.

(21) Appl. No.: 13/683,122

(22) Filed: Nov. 21, 2012

(65) Prior Publication Data

US 2014/0139652 A1 May 22, 2014

(51) Int. Cl.
*H04N 13/04* (2006.01)
(52) U.S. Cl.
CPC ..... *H04N 13/0418* (2013.01); *H04N 13/0402* (2013.01); *H04N 13/0404* (2013.01); *H04N 13/047* (2013.01); *H04N 13/0468* (2013.01)

(58) Field of Classification Search
CPC .......... H04N 13/0404; H04N 13/0468; H04N 13/047
See application file for complete search history.

(56) References Cited

U.S. PATENT DOCUMENTS

| | | | |
|---|---|---|---|
| 5,936,767 A | 8/1999 | Favalora | |
| 7,375,885 B2 | 5/2008 | Ijzerman et al. | |
| 7,425,069 B2 | 9/2008 | Schwerdtner et al. | |
| 7,688,509 B2* | 3/2010 | Vissenberg | G02B 26/005 345/6 |
| 8,401,081 B2* | 3/2013 | Doser | 375/240.16 |
| 8,514,272 B2* | 8/2013 | Reichelt | G02B 26/005 345/205 |
| 9,039,179 B2* | 5/2015 | Brown et al. | 351/208 |
| 2002/0036648 A1* | 3/2002 | Putilin | 345/629 |
| 2003/0133640 A1* | 7/2003 | Tiefenthaler | 385/12 |
| 2004/0223218 A1* | 11/2004 | Putilin et al. | 359/462 |
| 2006/0038879 A1* | 2/2006 | Kremen | 348/51 |

(Continued)

FOREIGN PATENT DOCUMENTS

| | | |
|---|---|---|
| WO | WO-94/23541 | 10/1994 |
| WO | WO-98/34411 | 8/1998 |

*Primary Examiner* — Brian Yenke
(74) *Attorney, Agent, or Firm* — Foley & Lardner LLP

(57) ABSTRACT

A 3D-display system alternates between directing light representing a left-eye view of a 3D image to a viewer's left eye and directing light representing a right-eye view of a 3D image to a viewer's right eye. To direct the light towards the viewer's eyes, the system receives eye-location data relative to a display device from an eye-tracking system and uses light deflectors, such as acousto-optic, electro-optic, and passive optical deflectors, to aim the light in a particular direction.

34 Claims, 12 Drawing Sheets

(56) References Cited

U.S. PATENT DOCUMENTS

| | | | |
|---|---|---|---|
| 2006/0098296 A1* | 5/2006 | Woodgate | G02B 27/2214 359/642 |
| 2006/0139711 A1* | 6/2006 | Leister et al. | 359/9 |
| 2006/0164528 A1* | 7/2006 | Harrold | H04N 13/0404 348/276 |
| 2006/0238545 A1* | 10/2006 | Bakin | G02B 27/2214 345/613 |
| 2006/0279567 A1* | 12/2006 | Schwerdtner | H04N 13/0418 345/419 |
| 2007/0236801 A1 | 10/2007 | Cha et al. | |
| 2007/0252953 A1* | 11/2007 | Metzger | G02B 27/2228 353/7 |
| 2008/0024598 A1* | 1/2008 | Perlin et al. | 348/55 |
| 2008/0198431 A1* | 8/2008 | Schwerdtner | 359/32 |
| 2008/0278805 A1* | 11/2008 | Schwerdtner | H04N 13/0402 359/463 |
| 2009/0102770 A1* | 4/2009 | Iwata | G09G 3/32 345/89 |
| 2009/0282429 A1* | 11/2009 | Olsson et al. | 725/10 |
| 2010/0014053 A1* | 1/2010 | Brentnall et al. | 353/7 |
| 2010/0027083 A1* | 2/2010 | Kroll et al. | 359/9 |
| 2010/0033813 A1* | 2/2010 | Rogoff | 359/463 |
| 2010/0149073 A1* | 6/2010 | Chaum | G02B 27/0093 345/8 |
| 2010/0194854 A1* | 8/2010 | Kroll et al. | 348/40 |
| 2010/0201894 A1* | 8/2010 | Nakayama et al. | 348/745 |
| 2010/0225743 A1* | 9/2010 | Florencio et al. | 348/46 |
| 2010/0315492 A1* | 12/2010 | Baik et al. | 348/51 |
| 2011/0032346 A1* | 2/2011 | Kleinberger | 348/59 |
| 2011/0102423 A1* | 5/2011 | Nam | H04N 13/0404 345/419 |
| 2011/0157168 A1* | 6/2011 | Bennett et al. | 345/419 |
| 2011/0164188 A1* | 7/2011 | Karaoguz et al. | 348/734 |
| 2011/0228054 A1* | 9/2011 | Gao | G03B 21/60 348/51 |
| 2011/0242150 A1* | 10/2011 | Song et al. | 345/697 |
| 2011/0261169 A1* | 10/2011 | Tin | 348/51 |
| 2011/0304613 A1* | 12/2011 | Thoresson | 345/419 |
| 2011/0310233 A1* | 12/2011 | Bathiche et al. | 348/51 |
| 2012/0105929 A1* | 5/2012 | Sung et al. | 359/9 |
| 2012/0120195 A1* | 5/2012 | Shows et al. | 348/46 |
| 2012/0127273 A1* | 5/2012 | Zhang et al. | 348/46 |
| 2012/0133643 A1* | 5/2012 | Tokunaga | 345/419 |
| 2012/0133734 A1* | 5/2012 | Tokunaga et al. | 348/43 |
| 2012/0182292 A1* | 7/2012 | Shimoyama et al. | 345/419 |
| 2012/0182407 A1* | 7/2012 | Yoshida | G02B 27/2214 348/54 |
| 2012/0194508 A1* | 8/2012 | Panas et al. | 345/419 |
| 2012/0200676 A1* | 8/2012 | Huitema et al. | 348/51 |
| 2012/0206445 A1* | 8/2012 | Chiba | 345/419 |
| 2012/0214634 A1* | 8/2012 | Mellet et al. | 475/149 |
| 2012/0224038 A1* | 9/2012 | Roth | 348/55 |
| 2012/0249524 A1* | 10/2012 | Yokote | 345/419 |
| 2012/0249758 A1* | 10/2012 | Saito et al. | 348/54 |
| 2012/0307357 A1* | 12/2012 | Choi et al. | 359/462 |
| 2013/0050787 A1* | 2/2013 | Han | G02F 1/335 359/10 |
| 2013/0135589 A1* | 5/2013 | Curtis | G02B 27/26 353/8 |
| 2013/0156265 A1* | 6/2013 | Hennessy | A61B 3/113 382/103 |
| 2013/0176407 A1* | 7/2013 | Curtis et al. | 348/52 |
| 2014/0118511 A1* | 5/2014 | Hyde et al. | 348/54 |
| 2014/0198297 A1* | 7/2014 | Bathiche et al. | 351/203 |
| 2014/0200079 A1* | 7/2014 | Bathiche et al. | 463/32 |
| 2014/0333735 A1* | 11/2014 | Bathiche et al. | 348/54 |
| 2015/0015681 A1* | 1/2015 | Kim et al. | 348/51 |
| 2015/0022440 A1* | 1/2015 | Liu et al. | 345/156 |
| 2015/0035953 A1* | 2/2015 | Bredehoft et al. | 348/51 |
| 2015/0049176 A1* | 2/2015 | Hinnen | H04N 13/007 348/59 |
| 2015/0054928 A1* | 2/2015 | Wu | 348/59 |
| 2015/0062311 A1* | 3/2015 | Malzbender | 348/51 |
| 2015/0077321 A1* | 3/2015 | Varekamp et al. | 345/102 |
| 2015/0091897 A1* | 4/2015 | Park et al. | 345/419 |
| 2015/0092026 A1* | 4/2015 | Baik et al. | 348/54 |
| 2015/0277123 A1* | 10/2015 | Chaum | G02B 27/0093 348/62 |

* cited by examiner

PULSED PROJECTION SYSTEM FOR 3D VIDEO

BACKGROUND 3D-display systems have existed in a variety of forms for many years. Generally, these systems convey a sense of depth by presenting slightly different views of a similar image to each of a viewer's eyes. One typical 3D-display system involves presenting two superimposed images simultaneously from a single display screen with each image modified in such a way that a specially designed light-filter may cancel out one image or the other. By placing a different filter in front of each of a viewer's eyes, the viewer may see one image in their left eye and a different image in their right eye when looking at the same display. If the two images are slightly offset views of the same scene, the viewer will instinctively combine the images into a 3D representation of the scene. Conventional systems have employed color filters (such as the red/cyan glasses), type of light-polarization (i.e., planar, elliptical, linear, etc.), or polarization angle as characteristics for filtering images using filters placed near to the eyes.

More recently, displays have been developed that can present 3D images without placing filters near the eyes. Such systems, known as autostereoscopic displays, hold tremendous potential for bringing 3D-display technology to a variety of untapped applications. Emerging uses for 3D technology include medical imaging, entertainment, diagnostics, education, and defense, among many other fields.

SUMMARY

In one embodiment, a method for displaying 3D images involves providing a display device and receiving data indicating locations of a viewer's eyes relative to the display device. The method further includes sequentially outputting, from the display device, light rays representing either a left-eye or a right-eye view of the 3D images and using a solid-state optical deflector to deflect, based on the received data, the light rays output from the display device.

In another embodiment, an autostereoscopic 3D-display device includes a display screen that sequentially displays right-eye and left-eye views of 3D images. The 3D-display device also includes an eye-tracking system configured to determine a left-eye location and a right-eye location relative to the display screen. Further, the 3D-display device includes an active solid-state deflection system to direct light rays, representing the left-eye and right-eye views, towards the determined left-eye and right-eye locations.

In yet another embodiment, a display control system for controlling an autostereoscopic 3D-display includes a processor, a set of communication interfaces, and a computer-readable medium storing program instructions. The communication interfaces include a display-screen interface, an eye-tracking system interface, and a deflector-system interface. The instructions are executable to cause the processor to receive, via the eye-tracking system interface, eye-location data indicating a left-eye and a right-eye location relative to the autostereoscopic 3D-display. The program instructions are further executable by the processor to transmit screen control signaling, via the display-screen interface, directing an autostereoscopic 3D-display device to sequentially output light rays representing either a left-eye or a right eye-view of 3D images. Additionally, the instructions are executable to cause the processor to transmit deflector control signaling, via the deflector-system interface, directing a deflector system to deflect the output light rays towards the detected eye locations in accordance with the received eye-location data.

In a still further embodiment, a non-transitory computer-readable medium contains program instructions executable by a processor to cause an autostereoscopic 3D-display device to perform certain functions. The functions include receiving eye-location data, indicative of a left-eye and a right-eye location view of the 3D images relative to the autostereoscopic 3D-display device. The functions also include sequentially outputting light rays representing a left-eye view of 3D images and light rays representing a right-eye view of the images. Further, the functions include using an active solid-state deflector to deflect the output light rays towards the indicated eye-locations.

The foregoing is a summary and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

To display 3D images, a display system may alternate between presenting a left-eye view and a right-eye view of an image and, while displaying each view, direct light rays towards either the left or right eye of a viewer in accordance with the view the system is currently displaying. For example, the system may track the position of a viewer's left eye and, when the system displays the left-eye view, direct light towards the tracked position of the left eye. Likewise, the system may track the position of the viewer's right eye and, when the system displays the right-eye view, direct light towards the tracked position of the right eye. In this way, the system may display the left-eye view to the viewer's left eye and the right-eye view to the viewer's right eye.

By using images that are offset in a way that mimics the real-life offset associated with viewing the same scene from the perspective of each eye, the display system may help to give the appearance of depth to a displayed image. In the following disclosure, example systems and media for producing such an effect are put forth and example operation of these or other systems is discussed.

Example Device and System Architecture

Figure 1:
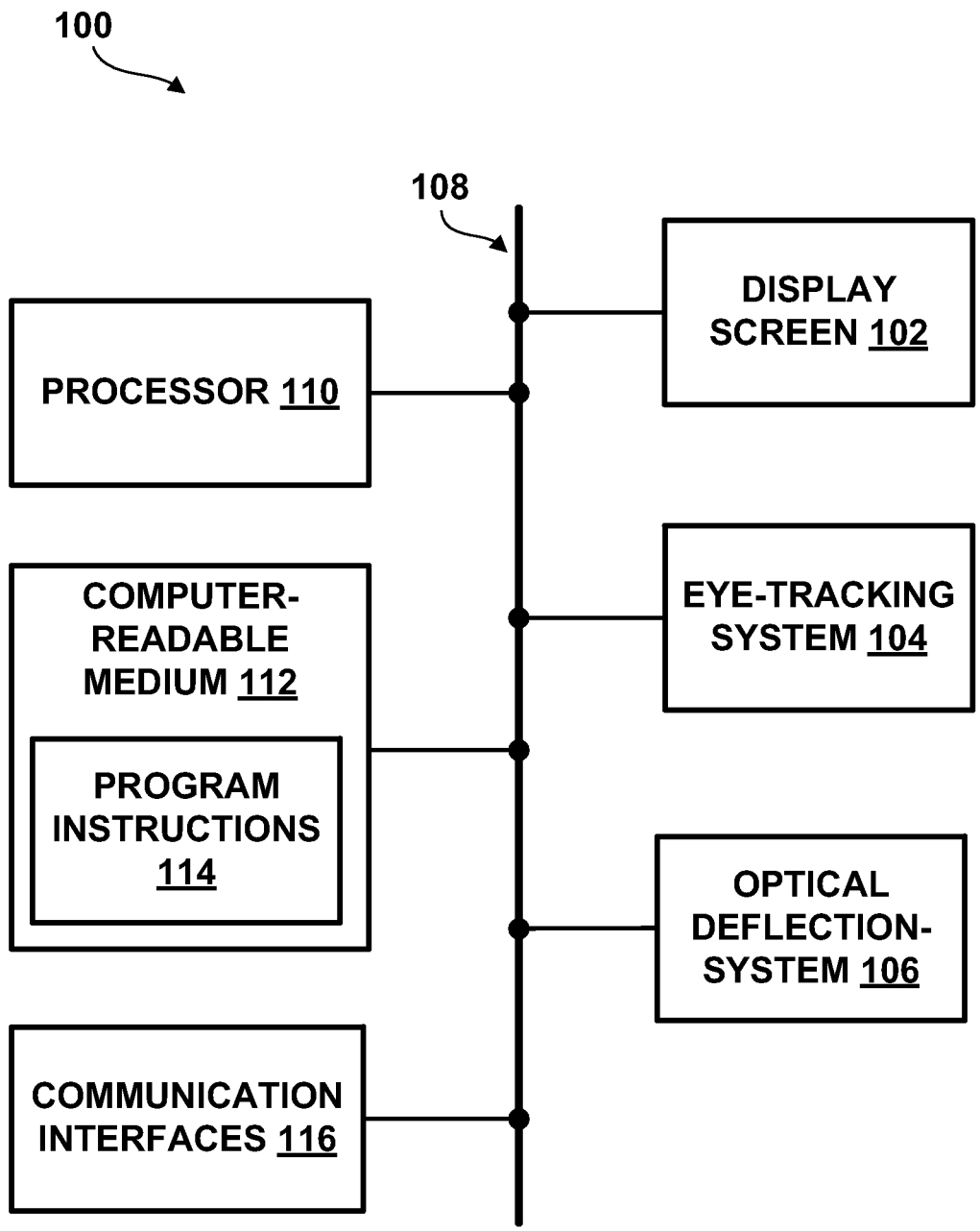
FIG. 1 is a schematic design of an autostereoscopic 3D display device according to an exemplary embodiment.

FIG. 1 is a schematic of a display system 100 according to an exemplary embodiment. As shown, display system 100 includes display screen 102, eye-tracking system 104, and optical-deflection system 106, each coupled to system bus 108. Display system 100 may also include processor 110, computer-readable medium (CRM) 112, with program instructions 114 stored thereon, and communication interfaces 116, as shown in FIG. 1. Some embodiments may not include all the elements shown in FIG. 1 and/or may include additional elements not shown in the example system of FIG. 1.

Display screen 102 may include one or more light sources and a variety of other optical features for presenting images. Light sources may include, for example, light emitting diodes, other electroluminescent components, incandescent light sources, gas discharge sources, lasers, electron emission sources, and/or quantum dot sources, among other existing and future light-source technologies. In an example display screen, sets of light sources may be organized into arrays and other such groupings in order to form complex images or patterns. In such an arrangement, each light source may behave as an individual illuminated location (sometimes referred to as a pixel) on a larger display screen. In other arrangements, single light sources may illuminate several pixels.

The light-producing elements of a display screen may connect to various display control interfaces. A control unit that signals the screen elements to manage the display may take various forms, as will be discussed in a later section. In some arrangements, a controller may independently signal each pixel through an individual electrical or optical connection.

In other arrangements, a set of pixels may interface collectively with a control unit. For example, three differently colored light sources may be signaled collectively so that the combined output produces a particular color. As another example, several superimposed signals may be transmitted to a set of pixels with each signal intended for one of the pixels. At the display screen, the combined signal may be filtered into its constituent parts and each signal sent to its intended pixel.

In still other arrangements, a controller may control a single light source in order to provide light for multiple pixels. For example, the light output from a single light source may be, expanded, split, and/or filtered to produce multiple simultaneously displayed pixels. As another example, a source may be configured to illuminate each of a set of display-locations on a display screen sequentially, cycling through the locations and providing light to each location one at a time. Other example control arrangements may also be used.

Optical features other than light sources may include, for example, lenses, mirrors, beam-splitters, liquid crystals, electronic ink, baffles, filters, polarizers, and/or waveguides. As one example, a lenticular display-screen may include arrays of small convex lenses (called lenticules) arranged above an underlying image in such a way as to magnify different portions of the underlying image depending on the angle from which the image is viewed. In particular, lenticules and underlying images may be designed so that two or more entirely different images are presented when the screen is viewed from specific angles. FIGS. 6A, 6B, 7A, and 7B show examples of lenticular display-screens in use. As will be discussed, optical deflectors may also be used to change the direction of light output from display screen 102. Other examples are possible.

In some implementations, optical elements other than light sources may be controllable through mechanical, electrical, acoustic, optical, or other stimuli. In such cases, a control unit may interface either independently or collectively with controllable elements in much the same way that arrays of pixels may be controlled.

Eye-tracking system 104 may also be included or connected to display system 100. In some arrangements, eye-tracking system 104 may be integral in the same device as display screen 102 and other elements. In other cases, eye-tracking system 104 may communicate with other elements of the system. For example those elements shown connected to system bus 108, through an electrical, optical, or other communicative interface. In some cases, eye-tracking system 104 may control itself and simply send eye-location data to the control and other elements in system 100. In other arrangements, eye-tracking system 104 may receive control signaling from a central controller in addition to sending eye-location data.

Eye-tracking system 104 may generate eye-location data (i.e. data indicating the location of a viewer's eyes relative to the display screen 102 as opposed to gaze direction, which would indicate the direction the eyes are gazing) in a variety of ways. For example, a video-processing approach may involve capturing images in the direction that display-screen 102 faces and analyzing the images to detect portions of the image that are representative of one or more eye locations. As another example, proximity sensors may determine eye-locations by sending optical or acoustic signals into an area, measuring signals that are reflected back towards the sensor, and processing the reflected signals to detect data that are indicative of at least one eye-position. In another arrangement, a user may wear or carry a device or other labeling element that eye tracking-system 104 may detect and use as an indication of the position of the viewer's eyes. Other systems may also be used.

In a video processing, proximity sensing, or other detection techniques, sensors may determine eye-locations from data representing the actual eye, such as an image of the eye or optical/acoustic waves reflected from the eye. Additionally or alternatively, sensors may determine eye-locations from data representing other parts of the viewer's body. For example, in response to receiving data that is indicative of the position and orientation of a viewer's head, the system may relate these head characteristics to a general template and thereby estimate the position of each of the user's eyes.

In some implementations, eye-tracking system 104 may occasionally generate new eye-location data by determining a current position of the detected eyes and updating the eye-location data with the most current position. For example, eye-tracking system 104 may determine eye-locations periodically, that is, at predefined time-intervals. In some cases, the time intervals between successive determination steps may be so brief as to create a substantially continuous trace of the eye-location. In some embodiments, the time-intervals at which eye-location data is updated are matched to those at which images are updated, for instance, a left-eye location can be measured (or predicted) just as a new left-eye image is ready to be outputted. In other embodiments, eye-tracking system 104 may determine eye-locations in response to a particular signal. For example, eye-tracking system 104 may receive movement data from one or more motion sensors and initiate an eye-location determination procedure in response to receiving data indicating a sufficiently large movement in the viewing area of a display screen 102. Other stimuli may also be used.

Eye-location data may indicate a variety of aspects related to the location, characteristics, and motion of the viewers' eyes. In some embodiments, the eye-location data may only indicate the relative directions (i.e., a relative angular position vector) from the display-screen to one or more detected eyes. Such directional position data may be gathered, for example, by comparing the direction from eye-tracking system 104 towards the detected eyes to the position of eye-tracking system 104 with respect to the display screen.

Additionally, eye-location data may indicate the relative distance from the display screen to the detected eyes. For example, a proximity sensor may determine relative distance of a detected object by modulating the output waves, comparing returning waves to output waves to determine the propagation time of the waves, and using the speed of propagation to calculate the distance of the object that reflected the wave.

Eye-location data may also indicate the movement of detected eyes. For example, eye-tracking system 104 may determine eye-locations occasionally and compare the determined set of eye-locations with one or more previous eye-locations in order to estimate the motion of detected eyes. In determining motion of a particular eye, the eye-location data from a current set of eye-locations may be associated with corresponding eye-location data in each of several previous sets of eye locations. For example, the eye locations may be associated based on a detected similarity in the data that represents each corresponding eye-location (e.g., image, geometry, reflectivity or other similarities of the data). As another example, corresponding eye-locations may be associated based on a detected similarity in their position relative to other eye-locations.

Using the current and previous values of eye-location from the associated eye-location data, eye-tracking system 104 may calculate motion characteristics associated with the determined eye-locations. Such motion information may include, for instance, speed, direction of movement, velocity, acceleration, movement pattern, and/or jerk, among other movement characteristics. Eye-tracking system 104 may then include the determined motion information in the eye-location data that it sends to the control, processing, or other elements of display system 100.

In some cases, eye-tracking system 104 may process motion information and current eye-location data in order to estimate future eye-locations. For example, in response to determining that a detected eye is moving in a particular direction at a particular speed, eye-tracking system 104 may estimate the distance the eye will move in a given duration of time by multiplying the given duration by the particular speed. Eye-tracking system 104 may then estimate the eye's future location at the end of the given duration by adding the estimated distance in the particular direction to the current eye-location. In other arrangements, the system may factor acceleration, jerk, or the other motion information into an estimation of the future eye-location. Then, eye-tracking system 104 may include the future eye-location data in the eye-location data that it sends to control elements in system 100.

In some embodiments, eye-tracking system 104 may also include other information about the determined eye-locations in the eye-location data. For example, in response to detecting two eye-locations that move together and/or are separated by less than a certain distance, eye-tracking system 104 may determine that the eye-locations represent one viewer's eyes and indicate that one is a left eye-location and the other is a right eye-location. As another example, a system may annotate eye-location data that represents a pair of eye-locations with an identifier of the viewer that they pair of eye-locations represent. For instance, in response to detecting no strong correlation between the movement and/or separation of one or more different pairs of eye-locations, eye-tracking system 104 may label each pair as, for example "VIEWER A", "VIEWER B", etc. Other labels may also be used and eye-location data may include many other forms of information as well.

Optical deflection system 106 may include any of several types of optical deflectors and may be controlled and implemented in a variety of ways. The optical deflectors discussed herein will fit into three categories: mechanically tunable deflectors, acousto-optical deflectors, and electro-optical deflectors. Additionally or alternatively, other deflection systems may be used in an example system. While passive deflectors offer the virtues of simplicity and lack of power requirements, their mechanical motion can present challenges in terms of response time, precision of deflection, and long-term reliability. Accordingly, in some embodiments, the use of active solid-state optical deflectors (such as acousto-optical or electro-optical) is advantageous.

Mechanically tunable deflectors are typically passive optical components, such as, lenses, waveguides, mirrors, and/or beamsplitters to name a few. When used with a fixed light source, such passive optical elements will typically deflect light from the fixed light source in the same way each time they are used. By physically moving the passive elements, though, the optical deflection may be altered. Optical deflection system 106, therefore, may include actuators, transducers, motors, and/or other mechanical movement elements in order to control the position and orientation of each passive deflector, thereby mechanically controlling the deflection of the light by these passive deflectors Acousto-optical deflectors use acoustic (e.g., sound) waves in an optical medium to control how light will propagate (and deflect) while passing through the medium. In particular, when a standing acoustic wave is generated in a material, the periodic nature of the wave produces a pattern of alternating regions of more dense and less dense material. This alternating pattern of density causes a corresponding alternating pattern of refractive index through the material, which, in turn, causes light passing through the material to diffract, undergoing partial scattering at the multiple evenly spaced planes defined by the alternating densities setup by the standing acoustic wave. Due to this periodic scattering, only light traveling in certain directions will constructively interfere and pass through the material, meaning that light will emerge from such a deflector only at certain angles. The allowed angles of emergence from such a deflector depend, among other things, on the frequency of the acoustic wave, i.e., the spacing between its waves. Therefore, acousto-optical deflectors may enable deflector system 106 to change the deflection angle (i.e., the angle of emergence) of light passing through the deflector selectively, by changing the frequency of the acoustic wave.

In some systems, acousto-optical deflectors may generate acoustic waves through only a thin layer at the surface of an optical element. Such a wave, called a surface acoustic wave (SAW), may produce a similar optical effect as bulk acoustic waves (i.e., acoustic waves through the bulk of the material).

To create a SAW, systems may send electrical signals to piezoelectric or other electro-mechanical transducers organized at the surface of an optical material. For instance, comb-shaped transducers may be organized in an interdigitated pattern so that alternating signals at the transducers may yield standing waves at the surface of the material. Other techniques may also be used.

Electro-optical deflectors controllably deflect light by passing light through specialized materials that are optically reactive to electrical signals. For instance, some crystals and polar liquids change refractive index in response to an applied electric field. In particular, those materials that exhibit the Kerr electro-optic effect change refractive index in proportion to the square of the strength of an applied electric field. Additionally, materials that exhibit the Pockels electro-optic effect change refractive index linearly with the strength of an applied electric field. Hence, deflection system 106 may send light through a material that exhibits either effect and control the light's angle of deflection by manipulating the electric field that it applies across the material. Other electro-optical and magneto-optical effects may be used in electro-optical deflectors.

In some embodiments, each pixel of display screen 102 may have an individual deflector associated with deflecting light from that pixel. In such a case, control elements may interface directly with each deflector or may interface with sets of deflectors. In other embodiments, several pixels and/or light sources may be associated with one or more deflectors, without a one-to-one association between a deflector and a pixel/light source. In other embodiments, the deflector system may function as a single deflector through which the light from each of the pixels may be deflected. For example, if a single deflector is configured to focus all the output light from display screen 102 towards one point, then deflection system 106 may manipulate characteristics (e.g., orientation, electric field strength, acoustic stimuli, etc.) of the deflector to control where all the light is focused.

Some embodiments may use several deflectors in combination in order to produce desired optical effects. For example, a system may mechanically move an acousto-optical deflector to make large changes to the deflection angle and then use acousto-optical effect to make smaller changes. As another example, a system may use mechanically tuned deflectors to change the depth of focus (i.e., how far from display screen 102 to focus light) and use electro-optical deflectors to adjust the angle of focus (i.e., the direction that the light is focused towards). Other examples are also possible. Systems that use multiple types of deflectors may use some deflectors for individual pixels while using other deflectors to deflect multiple points of light.

As shown in FIG. 1, display system 100 may also include computing elements for control of system 100 and processing of signals to/from display screen 102, eye-tracking system 104, and optical deflection system 106. In particular, display system 100 includes a processor 110 and CRM 112. CRM 112 may contain program instructions that may be executed by processor 110 to cause elements of system 100 to perform certain functions. Processor 110 and CRM 112 may be integrally connected in a display device or these elements may connect locally or remotely to a display device.

Processor 110 may include any processor type capable of executing program instructions 114 in order to perform the functions described herein. For example, processor 110 may be any general-purpose processor, specialized processing unit, or device with a processor. In some cases, multiple processing units may be connected and utilized in combination to perform the various functions of processor 110.

CRM 112 may be any available media that can be accessed by processor 110 and any other processing elements in system 100. By way of example, CRM 112 may include RAM, ROM, EPROM, EEPROM, CD-ROM or other optical disk storage, magnetic disk storage or other magnetic storage devices, or any other medium that can be used to carry or store desired program code in the form of program instructions or data structures, and which can be executed by a processor. When information is transferred or provided over a network or another communications connection (either hardwired, wireless, or a combination of hardwired or wireless) to a machine, the machine properly views the connection as a machine-readable medium. Thus, any such connection to a computing device or processor is properly termed a CRM. Combinations of the above are also included within the scope of computer-readable media. Program instructions 114 may include, for example, instructions and data that are capable of causing a general-purpose computer, special purpose computer, special purpose processing machines, or processing unit to perform a certain function or group of functions.

In some embodiments, display screen 102, eye-tracking system 104 and/or optical deflection system 106 may include separate processing and storage elements for execution of particular functions associated with each system. As an example, eye-tracking system 104 may store previous eye-location data in an internal CRM and use internal processors to estimate future eye-locations. In this example, eye-tracking system may autonomously determine future eye-location data and report the estimated future eye-locations.

As an alternative example, eye-tracking system 104 may transmit current eye-location data to processor 110 and CRM 112 and processor 110 may perform execute computer functions to estimate future eye-locations. Indeed, any of the processing, calculating, estimating, or control functions described above as being performed by the display screen 102, eye-tracking system 104 and/or optical deflection system 106 may alternatively be performed by processor 110. In some cases, specific processors and CRM may be dedicated to the control or operation of one system although not integrated into that system. For example, processor 110 may include a deflection-control subsystem that uses a special-purpose processing unit to service optical deflection system 106.

Display system 100 also includes communication interfaces 116 for communicating with local and remote systems. Communication interfaces 116 may include, for example, wireless chipsets, antennas, wired ports, signal converters, communication protocols, and other hardware and software for interfacing with external systems. For example, display system 100 may receive 3D images via communication interfaces 116 from content providers (e.g., television, internet, video conferencing providers, etc.) or from local media sources (e.g., gaming systems, disc players, portable media players, computing systems, cameras, etc.) As another example, display system 100 may receive user-input and user-commands via communication interfaces 116 such as, for instance, remote control signals, touch-screen input, actuation of buttons/switches, voice input, and other user-interface elements.

Figure 2:
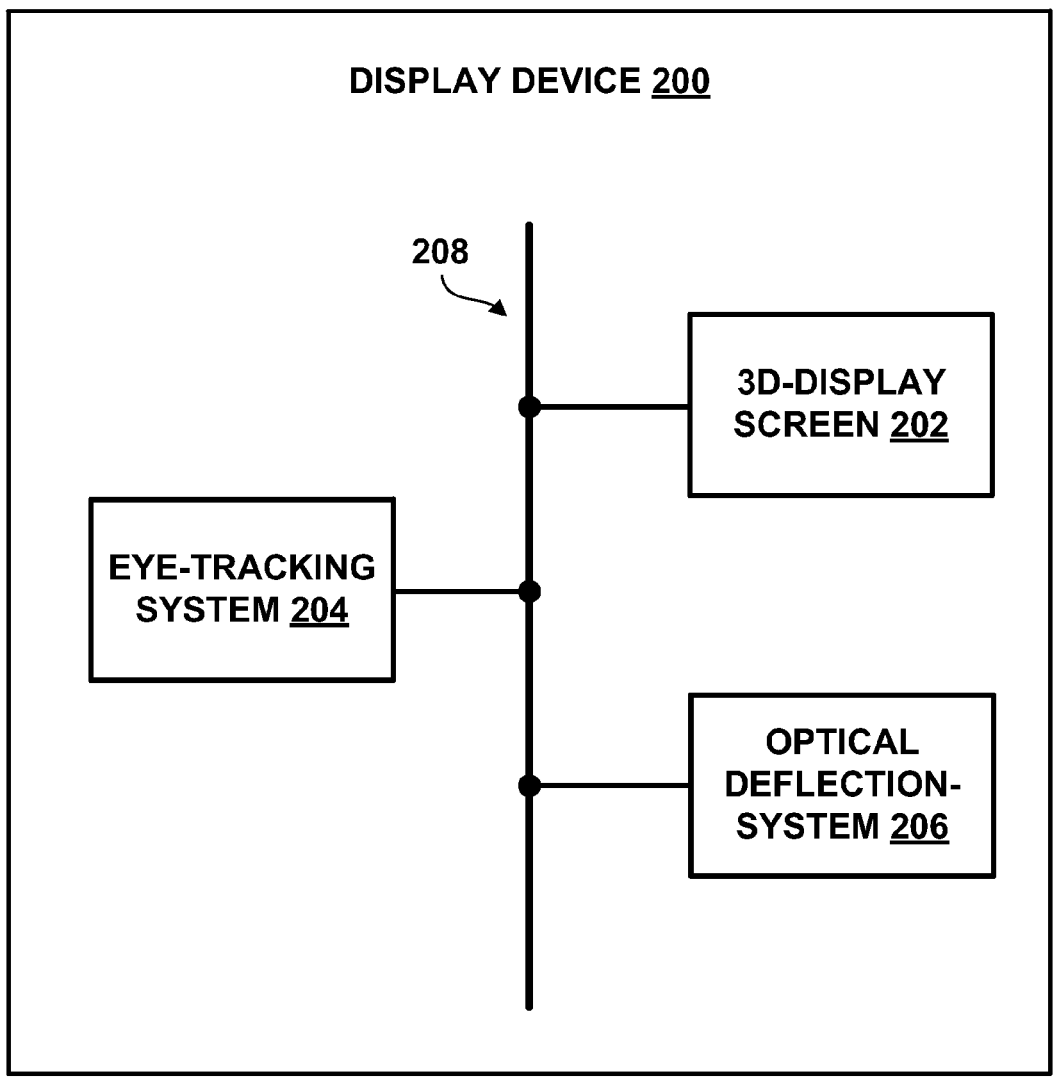
FIG. 2 is a schematic design of a display device according to an exemplary embodiment.

FIG. 2 is a block diagram showing elements of a display device according to an exemplary embodiment. As shown, display device 200 includes a display screen 202, an eye-tracking system 204, and an optical deflection-system 206 with each element connected to system bus 208. Any of the elements may contain processing and storage elements, including executable instructions, for performing particular functions associated with that element. A display device as represented by the block diagram of FIG. 2 may be, for example, a television, a gaming system, a portable device (e.g., phone, tablet, PDA, electronic book, or media player), or a computer monitor, among many other possibilities.

Figure 3:
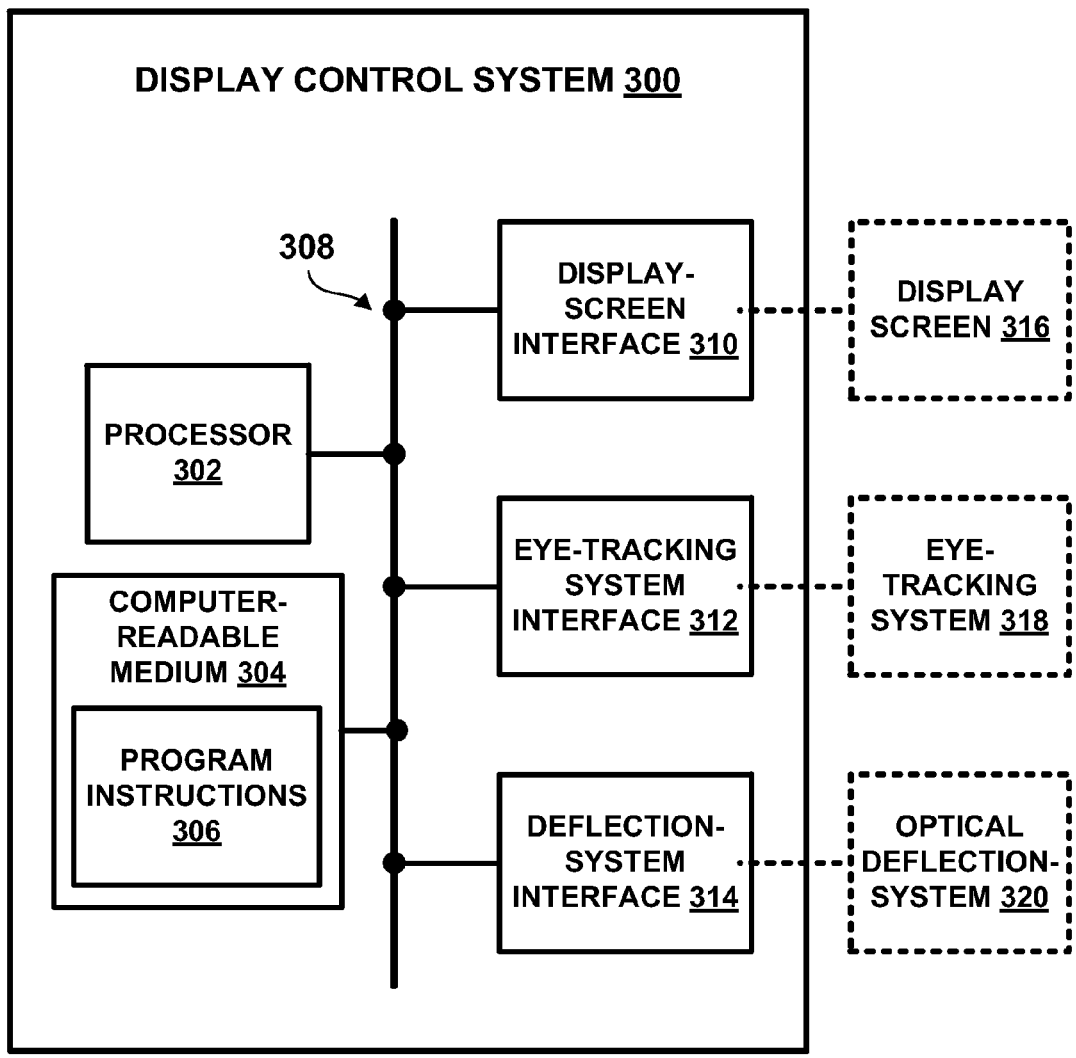
FIG. 3 is a schematic design of a display control device according to an exemplary embodiment.

FIG. 3 is a block diagram showing elements of a display control device 300, configured according to an exemplary embodiment. As shown, display control device 300 includes a processor 302 and CRM 304 with program instructions 306 stored thereon. In practice, computing elements such as processor 302 and CRM 304 may include multiple physical processing and storage media so that each computing element may be associated with a particular system/element serviced by control device 300. Such computing elements may function to receive data or input from other systems/elements and send control signaling, instructions, and other communications to the systems/elements. In the example system of FIG. 3, display screen 316, eye-tracking system 318, and optical deflection system 320 are shown as such systems/elements.

To facilitate communication with external systems/elements, control device 300 may include a set of control interfaces (such as, display-screen interface 310, eye-tracking system interface 312, and deflection-system interface 314). Some control interfaces may be as simple as a single wired and/or wireless connection. Other control interfaces may include several connections and/or may utilize specific hardware and/or software to enable communication.

A display control device may be integral in a display device or system or it may externally connect to the elements of the display device or system. In some embodiments, the control device may be implemented in one element of a display system and communicate with other elements through specific interfaces. For example, display control device 300 may be integrated within the eye-tracking system and send control signals to the display screen and deflection systems through interfaces. As another example, control device 300 may be integrated within the display-screen and interfaces with the deflection and eye-tracking systems through removable connections. In either example, the resulting system may allow for easy replacement of elements. Other example systems are possible.

Example Operation

Functions and procedures described in this section may be executed according to any of several embodiments. For example, procedures may be performed by specialized equipment that is designed to perform the particular functions. As another example, the functions may be performed by general-use equipment that executes commands related to the procedures. As still another example, each function may be performed by a different piece of equipment with one piece of equipment serving as control or with a separate control device. As a further example, procedures may be specified as program instructions on a computer-readable medium.

Figure 4:
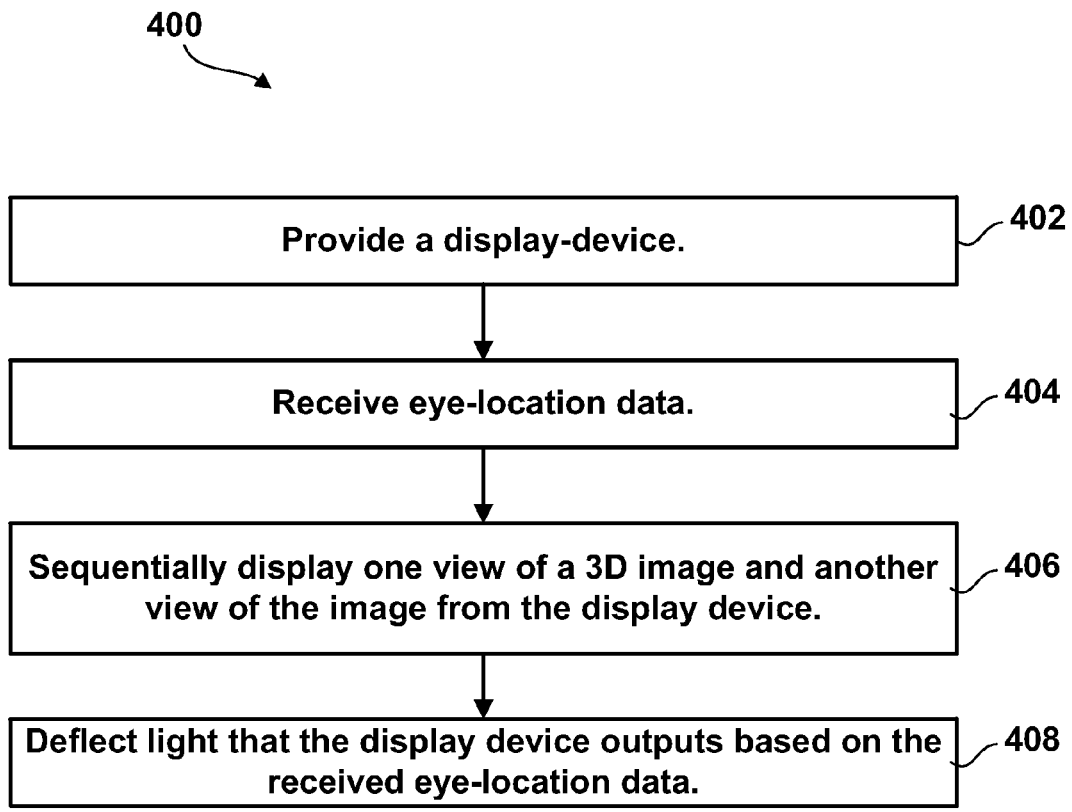
FIG. 4 is a flowchart of a process according to an exemplary embodiment.

FIG. 4 is a flowchart illustrating a method 400 according to an exemplary embodiment. As shown, method 400 involves providing a display-device (step 402). Method 400 further involves receiving eye-location data (step 404). Method 400 further involves sequentially displaying one view of a 3D image and another view of the image from the display device (step 406). Method 400 further involves deflecting the light that the display device outputs based on the received eye-location data (step 408).

As discussed above, eye-location data may be generated in various ways. Eye-location data may be generated, for example, by a dedicated eye-tracking system. Alternatively, eye-location data may be generated by a processor in a display device using features of the device. In some cases, eye-location data may be simply used without regard for the original source of the data. Further, eye-location data may be received and/or generated occasionally in order to provide updated data. In some cases, the updated data may be periodically generated and/or received. In other cases, updated data may be generated and/or received in response to particular signals, inputs, or determinations.

Additionally, eye-location data may portray or represent various characteristics of detected eyes. For example, eye-location data may represent the spatial position of the detected eyes in any coordinate system in one, two, or three dimensions. As another example, eye-location data may represent estimated future locations of the detected eyes. As a further example, eye-location data may represent the movement of the detected eyes. As still another example, eye-location data may represent specific characteristics of the detected eyes (e.g., right eye, left eye, first viewer, second viewer, specific viewer identity, etc.)

Sequentially outputting light representing the views of the 3D image may also be performed in several ways. As one example, each pixel of a display screen, such as display screen 102, may alternate between outputting light that represents one view of the 3D image (for instance, a left-eye view) and outputting light that represents a second view of the 3D image (for instance, a right-eye view). In some embodiments, all pixels may alternate in unison so that one view is fully displayed at a first time and the second view is fully displayed at a second time. In another embodiment, a system may divide the pixels into two groups with each group displaying one view at the first time and the other view at the second time. In such an embodiment, each view may be partially displayed at all times, with the part of the view that is displayed alternating between the two groups of pixels. In still other embodiments, each pixel may independently sequence between displaying views.

In some embodiments, the displayed 3D images may include 3D video. 3D video may include short-duration video associated with computer applications and graphical user-interfaces. Additionally, 3D video may include longer-duration video including streaming media, video-based applications/games, and/or media read from memory devices. Numerous other video types and sources may be displayed in various exemplary embodiments.

In order to convey a continuous image or video to a viewer, the system may sequentially display the views at a sequence rate that is faster than a rate at which an eye can perceive that the image is flickering. In some embodiments, the sequence rate may be faster than about 30 Hertz (i.e., each view is displayed about 30 times per second). In other embodiments, the sequence rate may exceed 100 Hertz. In still other embodiments, the rate may change in response to particular determinations or instructions. For example, if the system uses the same pixels to display images to each of several viewers, then the system may increase the sequence rate in accordance with an increase in the number of viewers. As another example, the system may decrease the sequence rate when displaying a more complex image (e.g., a high-definition image or an image in which one view differs greatly from the other view) and increase the cycle rate for a less complex image. As yet another example, a system that is designed to serve several different display devices may determine the image-generation frequency of the display device that it is currently serving and adjust the sequence rate to match the image generation frequency. The image-generation time of a particular display device may be the amount of time that the display device takes between successive steps of refreshing the image in a video.

In addition to displaying views of a 3D image, an exemplary sequence may involve transition periods in which no image is displayed on some or all of the pixels. A sequence may also involve some transitions in which a combination of both images is displayed at some or all of the pixels.

At step 408, method 400 involves deflecting the light rays that represent the views of the 3D image in accordance with the eye-location data. As explained above with reference to example system and device architectures, deflection systems may utilize a variety of different optical deflectors (e.g., mechanically controlled, acousto-optical, and/or electro-optical) to control the direction and focus of light rays emitted from a display screen.

In an exemplary embodiment, deflectors may serve to point light rays towards the detected eyes of the viewer(s). For example, each pixel may emit a beam or beams through optical-deflection system 106 so that optical-deflection system 106 may deflect the beam towards the direction of a detected eye represented by received eye-location data. In practice, the direction of the detected eye may be slightly different for each pixel of the display screen due to the position of the pixel. An exemplary procedure may therefore involve determining the direction of the detected eye with respect to each pixel and deflecting the light rays from each pixel in the respective determined direction of the eye. In other embodiments, deflection system 106 may determine the direction of the detected eye with respect to a reference pixel and deflect the light from each pixel based on a predefined relationship between the reference pixel and each other pixel. In this way, light from each pixel may be appropriately deflected without requiring the system to calculate a deflection angle for each pixel explicitly.

In some cases, deflection system 106 may directly receive eye-location data and determine how to deflect the light rays by executing program instructions at a processing or control unit contained in deflection system 106. In other embodiments, deflection system 106 may receive deflector control signaling from eye-tracking system 104 or from a control unit (such as, processor 110 or display control system 300). Control systems may generate deflector control signaling based on eye-location data.

In one aspect, deflection system 106 may sequentially deflect the light rays to each of the detected eye-locations. In particular, deflection system 106 may deflect the light towards one eye during a first time and deflect light towards another eye during a second time. In some embodiments, deflection system 106 may be configured to change which eye-location receives the light at roughly the same time as display screen 102 changes which view of the 3D images it displays. Such a configuration may help to simplify the process of displaying the correct view to the correct eye.

Figure 5A:
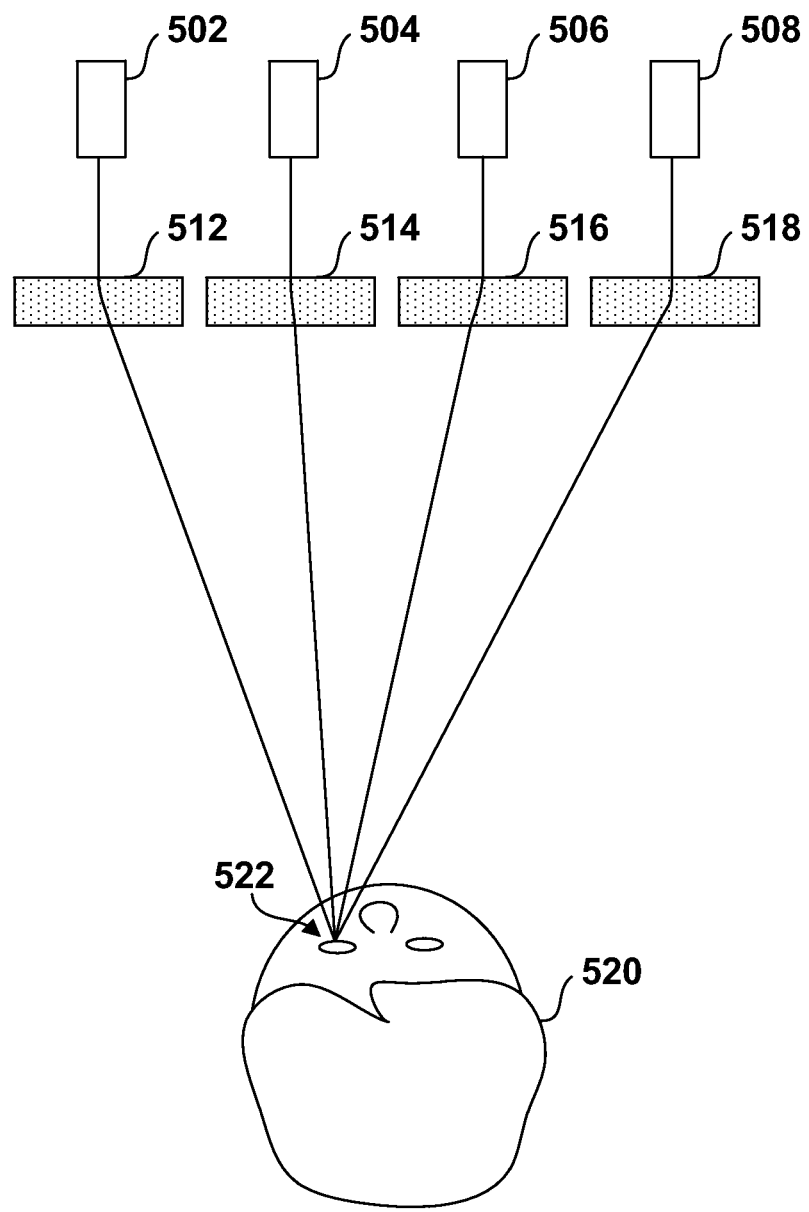
FIG. 5A is a light-ray diagram of an example embodiment in use.
Figure 5B:
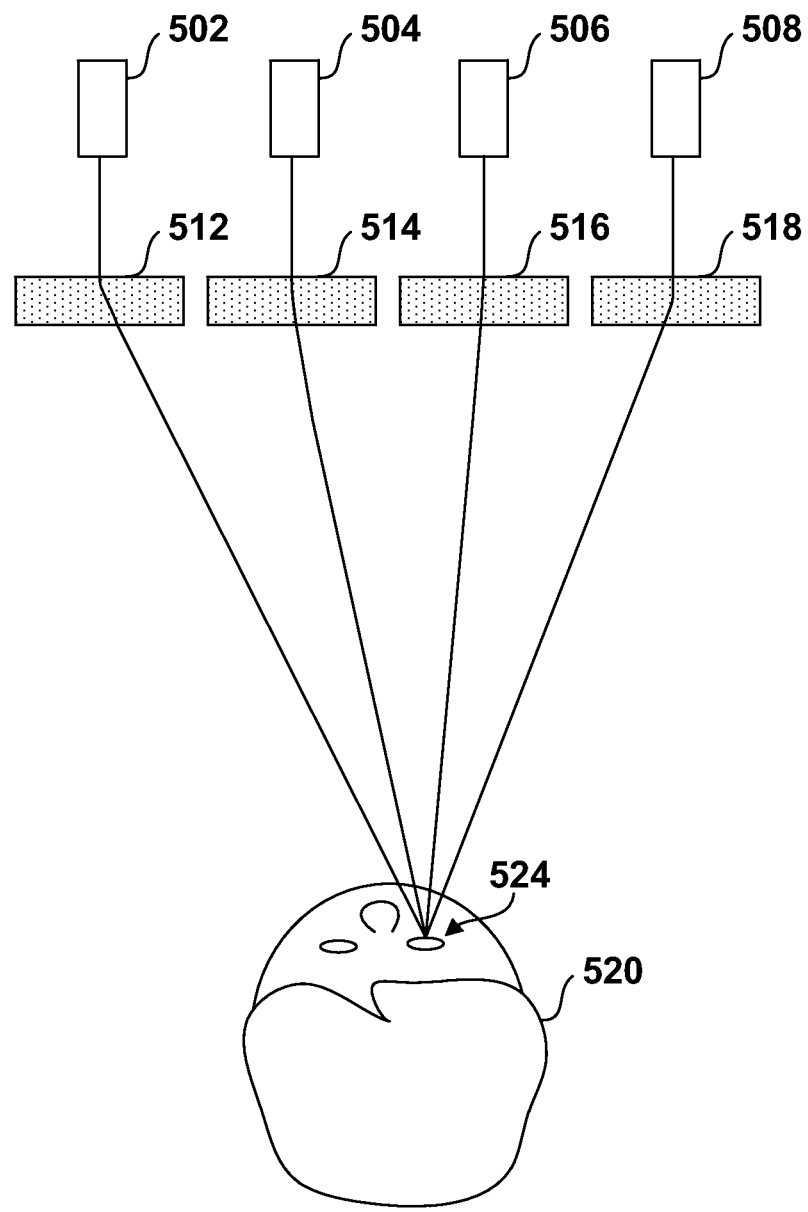
FIG. 5B is a light-ray diagram of an example embodiment in use.

FIGS. 5A and 5B show light-ray diagrams of example embodiments in use. In particular, FIG. 5A shows light rays deflecting towards a left viewer-eye 522 at a first time-step and FIG. 5B shows light rays deflecting towards a right viewer eye 524 at a second time-step. As shown in FIG. 5A, light is emitted from light sources 502, 504, 506, and 508, through optical deflectors 512, 514, 516, and 518 towards the left viewer-eye 522 of viewer 520. Although deflectors 512-518 are shown as separate devices in FIGS. 5A-B, an example optical-deflection system may alternatively use a single-device deflection system.

As shown in FIG. 5B, at the second time-step, light sources 502, 504, 506, and 508 continue to emit light rays through optical deflectors 512, 514, 516, and 518. In contrast to the first time-step, however, optical deflectors 512-518 deflect light towards the right viewer-eye 524 of viewer 520, at the second time-step. In an example process, the light may alternate between the first and second time-steps. The time-step shown in FIG. 5A is termed the "first" time-step only to differentiate it from the second time-step. Throughout the present disclosure, no intended order of operations should be implied from the labels "first" or "second" unless otherwise specified.

Figure 6A:
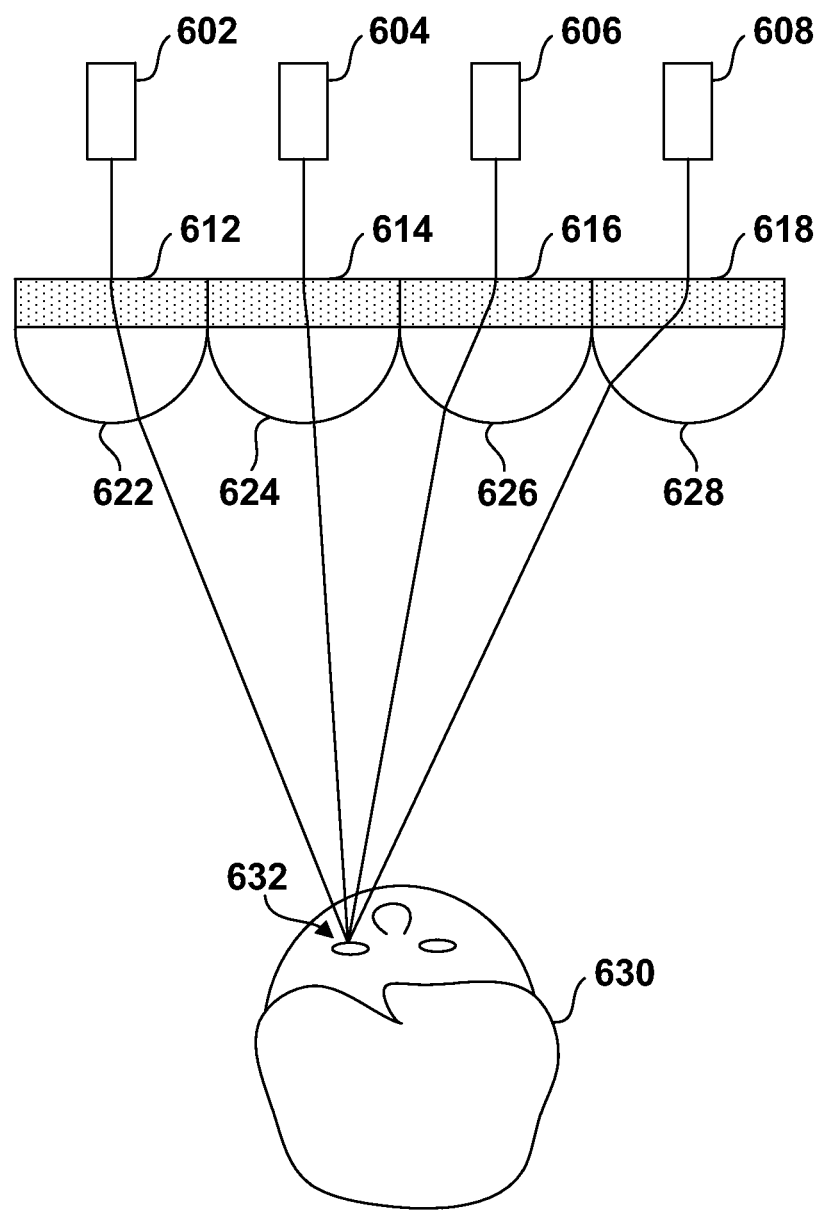
FIG. 6A is a light-ray diagram of an example embodiment in use.
Figure 6B:
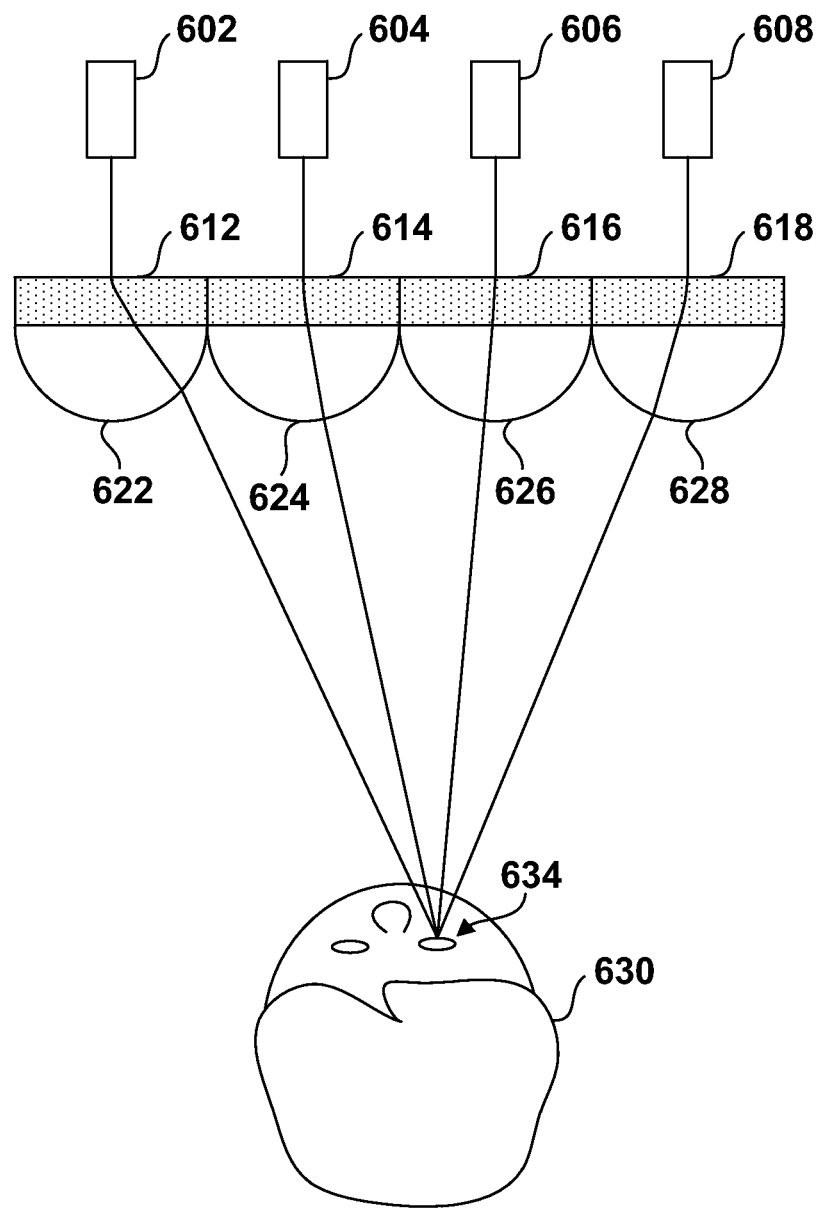
FIG. 6B is a light-ray diagram of an example embodiment in use.

FIGS. 6A and 6B show a similar process as illustrated in FIGS. 5A and 5B being performed with a lenticular display-screen. In particular, as shown in FIG. 6A, light sources 602, 604, 606, and 608 emit light rays that transmit through optical deflectors 612, 614, 616, and 618 and lenticules 622, 624, 626, and 628 towards the left viewer-eye 632 of viewer 630. The relative size of objects, such as the lenticules and light sources, are not to any scale and may be out of proportion with an actual implementation. As shown, lenticules 622-628 passively (i.e., without requiring power or control) deflect the light rays. In embodiments using lenticules, parallax barriers, and/or other non-controlled optical elements, the system may e configured to adjust for any optical effects (e.g., deflection, obstruction, scattering, absorption, reflection, polarization, etc.) In such an embodiment, the system may be programmed either with a particular adjustment or with instructions for automatically determining an appropriate adjustment. For example, a system may calibrate optical deflectors by emitting light rays, measuring the returning light to determine optical changes made by passive elements, and adjusting the deflection system to compensate for the detected changes.

In some embodiments, deflection system 106 may cycle through a sequence using a timing other than that shown in FIGS. 5A-6B. For example, if one pixel must display views to two viewers, then, while display screen 202 outputs the right-eye view of the 3D images, deflection system 106 may cycle through deflecting the light towards each viewer's right eye. Such a configuration may allow display screen 102 to sequence at the same rate, regardless of how many viewers are watching, without employing separate pixels for each viewer. Other implementations are also possible.

In the example of a system that concurrently displays one view of a 3D image through one set of pixels and another view of the 3D image through a second set of pixels, deflection system 106 may deflect light from each set toward a different eye-location. For example, when the first set of pixels displays the right-eye view of the images, deflection system 106 may deflect the light from the first set of pixels towards an eye-location that is labeled as a right eye-location. At the same time, deflection system 106 may deflect the light from the second set of pixels towards an eye-location that is labeled as a left eye-location in response to determining that the second set of pixels is displaying the left-eye view of the images.

Figure 7A:
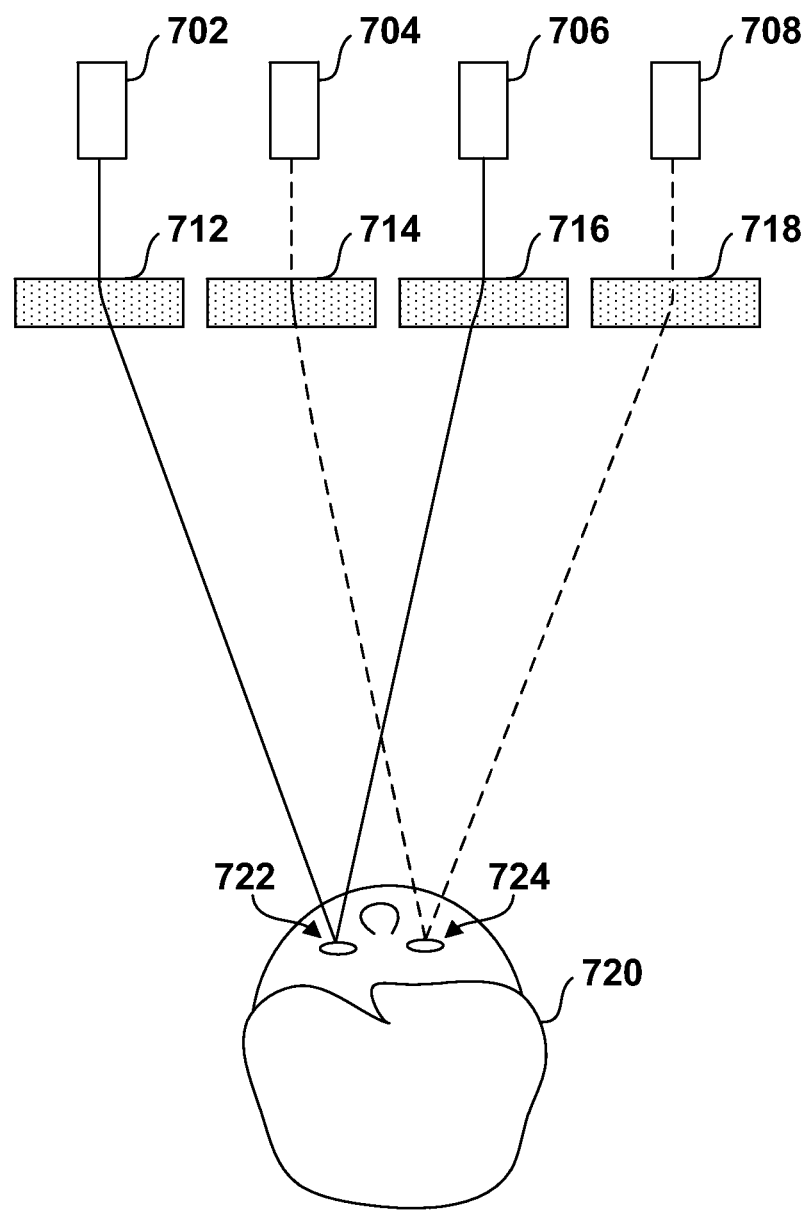
FIG. 7A is a light-ray diagram of an example embodiment in use.
Figure 7B:
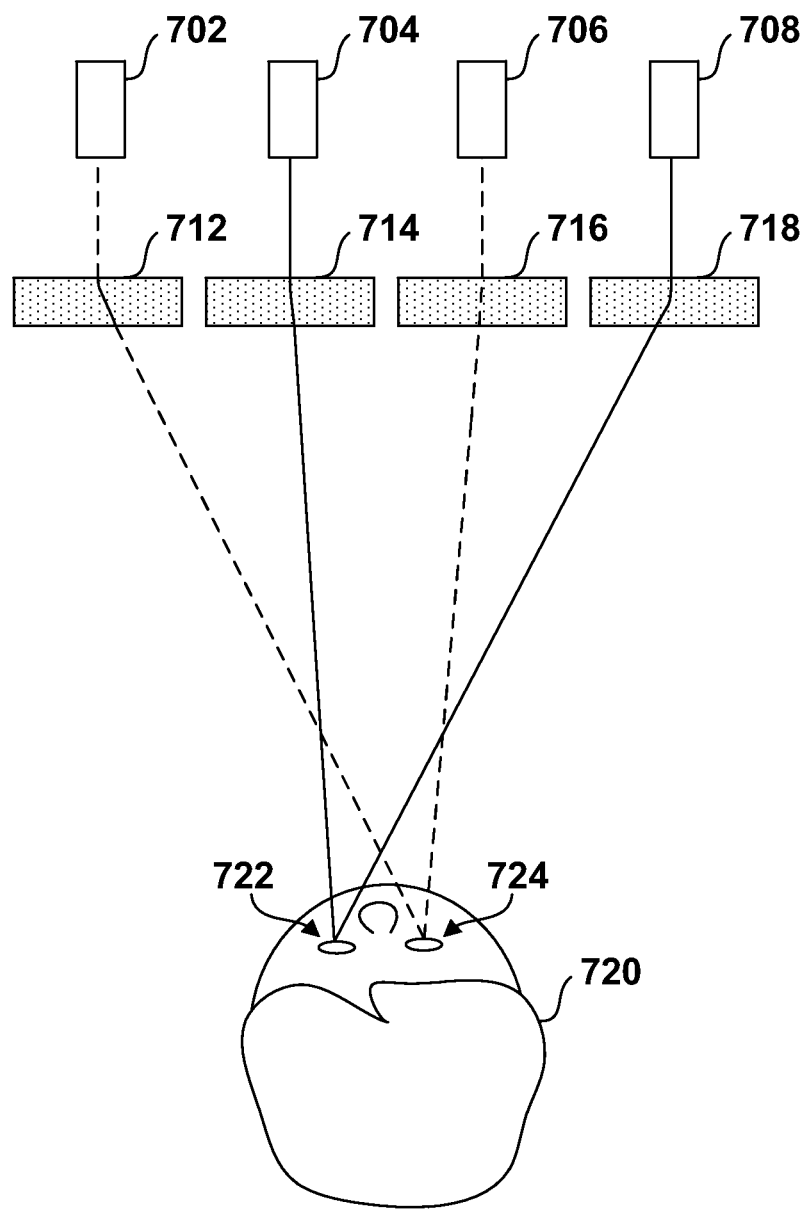
FIG. 7B is a light-ray diagram of an example embodiment in use.

Such an implementation is shown in FIGS. 7A and 7B. As shown in FIG. 7A, at the first time-step, light rays representing portions of the left-eye view (shown in solid lines) are emitted from light sources 702 and 706, through deflectors 712 and 716, and into the left viewer-eye 722 of viewer 720. As also shown in FIG. 7A, light rays representing portions of the right-eye view (shown in dashed lines) are emitted from light sources 704 and 708, through deflectors 714 and 718, and into the right viewer-eye 724 of viewer 720.

At the second time-step, as shown in FIG. 7B, the light rays representing portions of the left-eye view (shown in solid lines) are emitted from light sources 704 and 708, through deflectors 714 and 718, and into the left viewer-eye 722 of viewer 720. Also as shown in FIG. 7B, light rays representing portions of the right-eye view (shown in dashed lines) are emitted from light sources 702 and 706, through deflectors 712 and 716, and into the right viewer-eye 724 of viewer 720.

When displaying images to more than one viewer, a 3D system may display the same set of images to each viewer (e.g., the right-eye view is displayed to the right eye of each set of eye locations and likewise with the left-eye view).

Figure 8A:
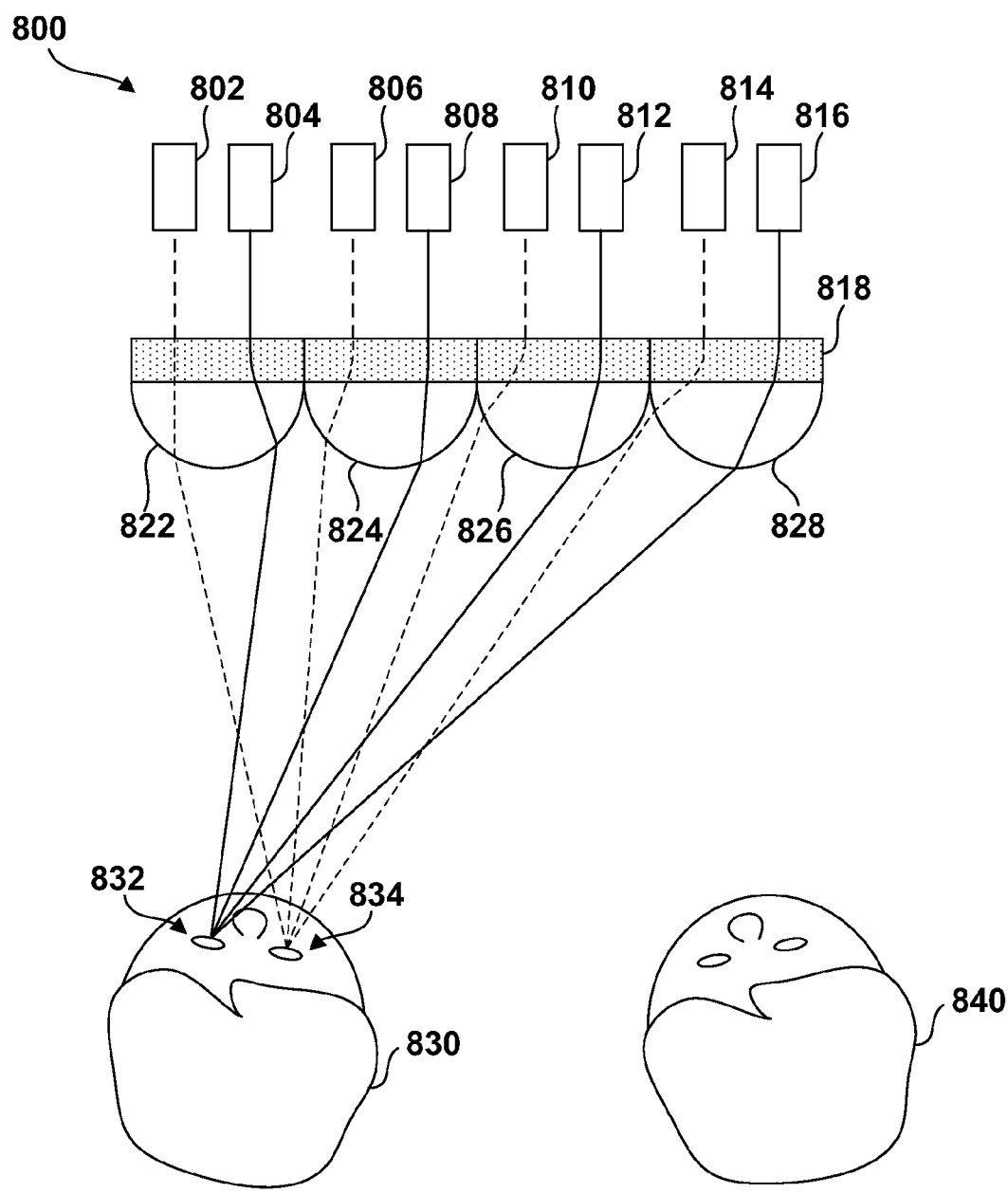
FIG. 8A is a light-ray diagram of an example embodiment in use.
Figure 8B:
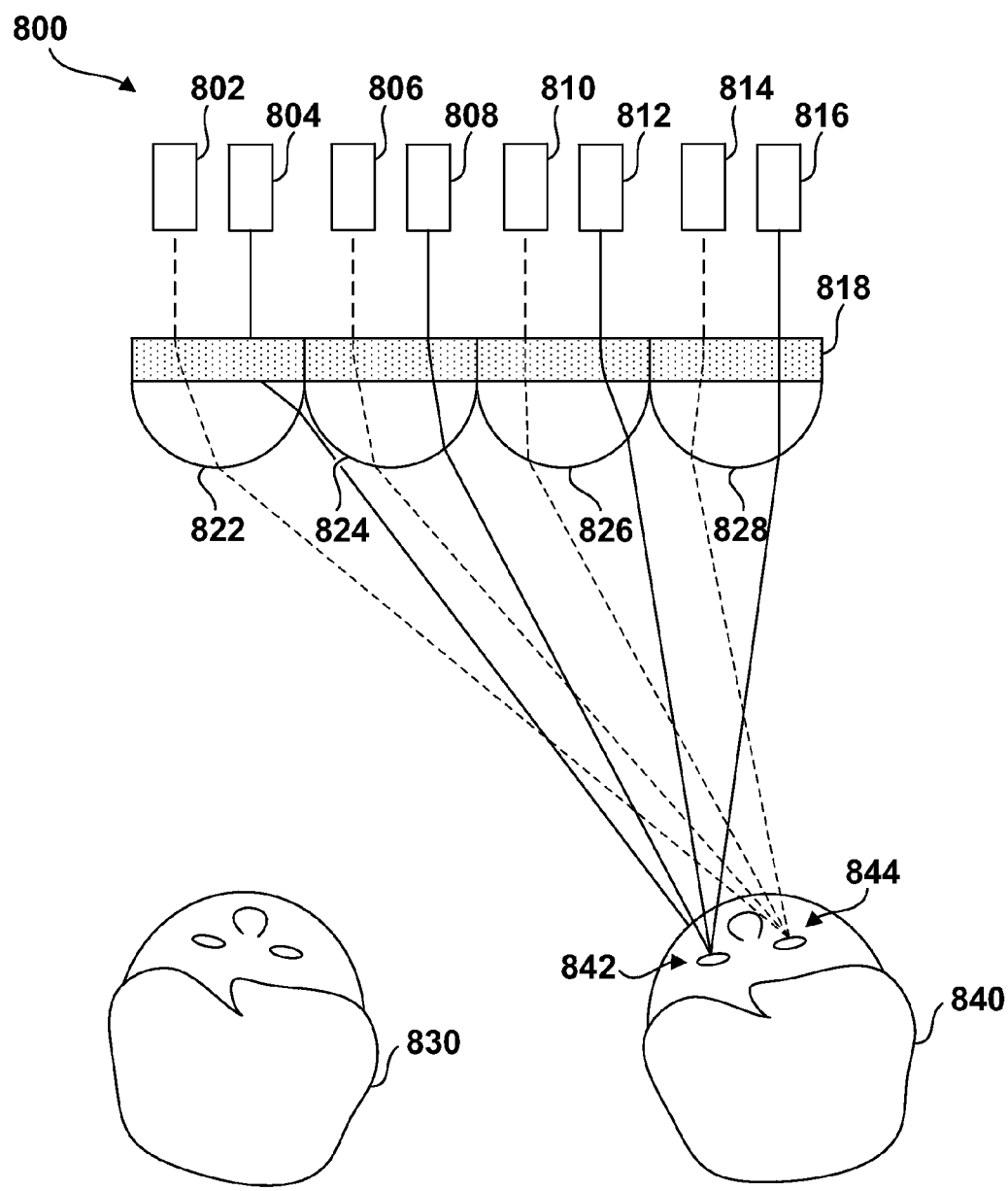
FIG. 8B is a light-ray diagram of an example embodiment in use.

FIGS. 8A and 8B are light-ray diagrams showing an example use of a particular embodiment. In particular, the light rays are deflected to the eyes of two viewers in an alternating sequence. The particular sequence shown involves displaying both the left and right views of the 3D images to viewer 830 at a first time-step (shown in FIG. 8A) and displaying both the left and right views of the 3D images to viewer 840 at a second time-step. As shown, at the first time-step, light sources 804, 808, 812, and 816 emit light rays (shown as solid lines) representing a left-eye view through optical deflector 818 and lenticules 822, 824, 826, and 828 towards the left viewer-eye 832 of viewer 830. Also at the first time-step, light sources 802, 806, 810, and 814 emit light rays (shown as dashed lines) representing a right-eye view through optical deflector 818 and lenticules 822, 824, 826, and 828 towards the right viewer-eye 832 of viewer 830. Although optical deflector 818 is shown as a single segmented deflector, other embodiments may include separate deflectors for each light source or lenticule.

At the second time-step, FIG. 8B shows that light sources 802-816 emit portions of the left and right views in the same way as in the first time-step. However, the light rays are deflected by deflector 818 so that, after passing through lenticules 822-828, the light rays are directed to left viewer-eye 842 and right viewer-eye 844 or viewer 840. Other implementations and procedures may be used as well to display 3D images to two or more viewers.

In other embodiments, different perspectives of the same image may be displayed to different viewers (or to the same viewer, if the viewer is mobile) depending on where the viewer is detected. For example, a viewer on the right side of the room may receive a slightly different image than a viewer on the left side of the room. Such a technique may help the 3D-display system to portray image parallax to the viewer.

In some other embodiments, the display system may display entirely different images to different viewers. As an example situation, some multi-player video games require viewers to each look at a different image (e.g., each player sees from their own character's perspective). In a typical gaming system, the display screen is divided into sections and each player's perspective occupies one section of the screen. In one embodiment of the present system, however, different images may be sent to the eye-locations associated each player, so that each player's perspective may occupy the entire screen and players may not see each other's perspective. In another example, a system may display an edited version of images to one viewer (e.g., the G-rated version of a movie) and an less-edited version of the images to another viewer (e.g., an R-rated version of the same movie). Other examples are possible.

In some embodiments, optical-deflection system 106 may direct light rays to a larger spot size encompassing the detected eye, rather than a focused spot on the eye. By directing light to a larger spot size that encompasses the eye, display system 100 may allow for small movements of the eye and/or imprecision in the detection procedure, without the light missing the viewer's eye. In other cases, deflection system 106 may direct the light to a focused spot on the eye. Such an arrangement may help to prevent the spot size from encompassing more than one viewer eye. In practice, a spot size may be selected to achieve both design features: allowing for imprecision and preventing display of one view to multiple eyes (e.g., both of one viewer's eyes or eyes of more than one viewer).

In another aspect, deflection system 106 may occasionally receive updated eye-location data and deflect the light towards the most recently updated eye-locations. In some cases, deflection system 106 may receive updated eye-location data each time that eye-tracker 104 generates such data. In other cases, deflection system 106 may receive eye-location data only when the updated eye-locations differ enough from previous eye-location data.

As described previously, eye-location data may include movement data associated with the eyes and/or estimated future eye-locations. Deflection system 106 may use such data in determining where to deflect the light. For example, deflection system 106 may process movement data to estimate the current eye-locations during the time between receiving updated eye-location data. As another example, deflection system 106 may direct light towards the estimated future eye-locations in a system where a significant time delay between eye-tracking system 104 detecting the eyes and deflection system 106 receiving the eye-location data. In such a system, eye-tracking system 104 may determine the time delay and use the delay in the estimation of the future eye-locations.

As described with respect to the example architecture, some implementations of deflection system 106 may use multiple deflector types to deflect light rays. As an example, deflection system 106 may use one type of deflector (e.g., mechanically controlled, bulk acoustic, SAW-based, and/or electro-optical) to coarsely adjust the direction of the light rays and a different type of deflector to finely adjust the direction of the light rays. As another example, deflection system 106 may use one type of deflector to direct light towards a set of eyes and use a different type of deflector to deflect the light towards the individual eyes in the set.

The construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. The elements and assemblies may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner. Accordingly, all such modifications are intended to be included within the scope of the present disclosure. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the scope of the appended claims.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

What is claimed is:

1. A method for displaying autostereoscopic 3D images, the method comprising:
   providing a display device;
   receiving eye-location data indicative of a first and second set of eye-locations relative to the display device, wherein the first set of eye-locations comprises a first left-eye location and a first right-eye location associated with a first viewer and the second set of eye-locations comprises a second left-eye location and a second right-eye location associated with a second viewer, the received eye-location data further indicative of movement of at least one of the first or second sets of eye-locations relative to the display device;
   sequentially outputting, from the display device, light rays representing a left-eye view of the 3D images and light rays representing a right-eye view of the 3D images for the first and second viewers;
   based at least in part on the received eye-location data, using an active solid-state optical deflector (i) to deflect the output light rays representing the left-eye view towards the first left-eye location and the second left-eye location and (ii) to deflect the output light rays representing the right-eye view towards the first right-eye location and the second right-eye location;
   estimating a refresh time corresponding to when the display device will refresh the displayed 3D images;
   estimating future eye-locations based at least in part on the indicated movement characteristics of at least one of the first or second set of eye-locations, wherein the estimated future eye-locations correspond with an expected eye-location of at least one of the first or second eye-locations at the estimated refresh time; and
   deflecting the output light rays towards the estimated future eye-locations at the estimated refresh time;
   wherein the light rays representing the first viewer right-eye and left-eye views are deflected towards the first set of eye-locations such that each light ray is directed to a focused spot smaller than an eye of the first viewer to prevent the first viewer right-eye and left-eye view from being viewed by an eye of the second viewer;
   wherein the light rays representing the second viewer right-eye and left-eye views are deflected towards the second set of eye-locations such that each light ray is directed to a second focused spot centered on an eye of the second viewer; and
   wherein the second focused spot is larger than an eye of the second viewer by an amount configured to facilitate a target amount of movement of the second viewer.

2. The method of claim 1, wherein the display device comprises a lenticular display-device.

3. The method of claim 1, further comprising:
   receiving additional eye-location data indicative of one or more updated first or second sets of eye-locations; and
   deflecting the output light rays based at least in part on the additional eye-location data.

4. The method of claim 3, further comprising:
   detecting motion in an area in front of the display device; and
   in response to the detected motion, instructing the eye-tracking system to generate the additional eye-location data.

5. The method of claim 3, wherein the eye-location data is received from an eye-tracking system, the method further comprising:
   occasionally instructing the eye-tracking system to generate the additional eye-location data; and
   using the estimated refresh time as a basis for determining when to instruct the eye-tracking system to generate the additional eye-location data.

6. The method of claim 3, wherein deflecting the output light rays based at least in part on the additional eye-location data comprises:
   determining whether a difference between the one or more updated first or second sets of eye-locations and a previous first or second set of eye-locations is larger than a non-zero threshold difference in the first or second eye-locations;
   in response to determining that the difference between the one or more updated first or second sets of eye-locations and the previous first or second set of eye-locations is larger than the non-zero threshold difference in the first or second eye-location, deflecting the output light rays based at least in part on the additional eye-location data.

7. The method of claim 1, wherein the display device comprises a mobile display-device.

8. The method of claim 1, wherein the active solid-state deflectors comprise acousto-optical deflectors, and wherein the acousto-optical deflectors use surface acoustic waves to deflect the light rays.

9. The method of claim 1, wherein using the active solid-state deflectors to deflect the output light rays comprises:
   using a first type of optical deflector to coarsely adjust a direction of the light rays; and
   using a second type of optical deflector to finely adjust the direction of the light rays.

10. The method of claim 9, wherein the first type of optical deflector is an electro-optical deflector, and wherein the second type of optical deflector is an acousto-optical deflector.

11. The method of claim 1, wherein using the active solid-state deflectors to deflect the output light rays comprises:
   using a first type of optical deflector to deflect the light rays in a direction associated with the first set of eye-locations; and using a second type of optical deflector to deflect the light rays to each of the first left eye-location and the first right eye-location.

12. The method of claim 11, wherein the first type of optical deflector is an electro-optical deflector, and wherein the second type of optical deflector is an acousto-optical deflector.

13. The method of claim 1, wherein sequentially outputting the light rays representing the left-eye view of the 3D images and the light rays representing the right-eye view of the 3D images comprises alternating between (i) outputting the light rays representing the left-eye view and (ii) outputting the light rays representing the right-eye view.

14. An autostereoscopic 3D-display device, comprising:
   a display screen configured to sequentially display right-eye and left-eye views of 3D images to a first and second viewer;
   an eye-tracking system configured to determine a first and second viewer set of eye-locations relative to the display screen, wherein the first and second viewer set of eye-locations comprises a first and second viewer left-eye location and a first and second viewer right-eye location; and
   an active solid-state optical-deflection system capable of directing light rays representing the displayed first and second viewer right-eye and first and second viewer left-eye views, wherein the active solid-state deflection system is configured to direct the light rays towards the determined first and second viewer set of eye-locations;
   wherein the active solid-state optical deflection system is configured to deflect the light rays representing the first viewer right-eye and left-eye views towards the first set of eye-locations such that each light ray is directed to a focused spot smaller than an eye of the first viewer to prevent the first viewer right-eye and left-eye view from being viewed by an eye of the second viewer;
   wherein the light rays representing the second viewer right-eye and left-eye views are deflected towards the second viewer set of eye-locations such that each light ray is directed to a second focused spot centered on an eye of the second viewer;
   wherein the second focused spot is larger than an eye of the second viewer by an amount configured to facilitate a target amount of movement of the second viewer; and
   wherein the eye-tracking system is further configured to determine movement of at least one of the first and second viewer set of eye-locations, estimate a refresh time when the autostereoscopic 3D-displayed images will refresh the displayed 3D images, and estimate future first and second viewer eye-locations relative to the display device based at least in part on the determined movement pattern of the at least one of the first and second viewer set of eye-locations corresponding with the first and second viewer set of eye-locations at the estimated refresh time, and wherein the active solid-state optical deflection system is further configured to direct the light rays based at least in part on the estimated future first and second viewer eye-locations.

15. The autostereoscopic 3D-display device of claim 14, wherein the active solid-state deflection system comprises an acousto-optical deflector, and wherein the acousto-optical deflectors use surface acoustic waves to deflect the light rays.

16. The autostereoscopic 3D-display device of claim 14, wherein the display screen comprises a lenticular display screen.

17. The autostereoscopic 3D-display device of claim 14, further comprising processing circuitry, wherein the eye-tracking system is further configured to determine one or more updated first and second viewer sets of eye-locations, and wherein the eye-tracking system is configured to use the estimated refresh time as a basis for timing when to determine the updated first and second viewer sets of eye-locations.

18. The autostereoscopic 3D-display device of claim 14, wherein the autostereoscopic 3D-display device uses an acousto-optical deflection system to deflect the light rays towards a direction associated with the first and second viewer sets of eye-locations and wherein the autostereoscopic 3D-display device uses electro-optical deflectors to deflect the light rays towards each of the first and second viewer left eye-locations and the first and second viewer right eye-locations.

19. The autostereoscopic 3D-display device of claim 14, wherein the autostereoscopic 3D-display device uses an electro-optical deflection system to deflect the light rays towards a direction associated with the first viewer set of eye locations and the second viewer set of eye-locations and wherein the autostereoscopic 3D-display device uses acousto-optical deflectors to deflect the light rays towards each of the first and second viewer left eye-locations and the first and second viewer right eye-locations.

20. The autostereoscopic 3D-display device of claim 14, wherein the display screen sequentially displays the first and second viewer left-eye and the first and second viewer right-eye views of the 3D images by alternating between displaying the first and second viewer left-eye view of the 3D images and displaying the first and second viewer right-eye view of the 3D images.

21. A display control system for controlling the display of images by an autostereoscopic 3D-display device to a first and a second viewer, the display control system comprising:
   a processor;
   a set of communication interfaces comprising (a) a display-screen interface, (b) an eye-tracking system interface, and (c) a deflector-system interface;
   a non-transitory computer-readable medium; and
   program instructions stored on the non-transitory computer-readable medium and executable by the processor to cause the processor to:
      receive, via the eye-tracking system interface, eye-location data indicative of a first and second viewer sets of eye-locations relative to the autostereoscopic 3D-display device, wherein the first and second viewer sets of eye-locations comprises a first and second viewer left-eye location and a first and second viewer right-eye location;
      transmit screen control signaling via the display-screen interface directing the autostereoscopic 3D-display device to sequentially output light rays representing a first and second viewer left-eye view of 3D images and light rays representing a first and second viewer right-eye view of the 3D images; and
      transmit deflector control signaling via the deflector-system interface directing an active solid-state deflector system to deflect the output light rays representing the first and second viewer left-eye views and the first and second viewer right-eye views of the 3D images towards the first and second viewer set of eye-locations in accordance with the received eye-location data;
   wherein the deflector control signaling causes the active solid-state deflector system to deflect the light rays representing the first viewer right-eye and left-eye views towards the first set of eye-locations such that each light ray is directed to a focused spot smaller than an eye of the first viewer to prevent the first viewer right-eye and left-eye view from being viewed by an eye of the second viewer;

wherein the light rays representing the second viewer right-eye and left-eye views are deflected towards the second viewer set of eye-locations such that each light ray is directed to a second focused spot centered on an eye of the second viewer;

wherein the second focused spot is larger than an eye of the second viewer by an amount configured to facilitate a target amount of movement of the second viewer;

wherein the received eye-location data further indicates movement of the first and second viewer sets of eye-locations;

wherein the program instructions are further executable to cause the processor to:

i) estimate a refresh time corresponding to when the 3D-display device will refresh the displayed 3D images; and (ii) estimate future first and second viewer eye-locations based at least in part on the indicated movement of the first and second viewer sets of eye-locations, wherein the estimated future first and second viewer eye-locations correspond with first and second viewer eye-locations at the estimated refresh time;

wherein the deflector control signaling further directs the deflector system to deflect the output light rays based on the estimated first and second viewer future eye-locations.

22. The display control system of claim 21, wherein the autostereoscopic 3D-display device comprises a lenticular display screen.

23. The display control system of claim 21, receive additional eye-location data via the eye-tracking system interface, wherein the additional eye-location data is indicative of one or more updated first and second viewer sets of eye-locations; and transmit additional deflector control signaling, via the deflector-system interface, directing the deflector system to deflect the output light rays based at least in part on the additional eye-location data.

24. The display control system of claim 23, wherein the program instructions are further executable to cause the processor to:

occasionally transmit eye-tracker control signaling, via the eye-tracking system interface, directing the eye-tracking system to generate the additional eye-location data;

and use the estimated refresh time as a basis for determining when to transmit the eye-tracker control signaling.

25. The display control system of claim 23, wherein the program instructions are further executable to cause the processor to:

detect motion in an area in front of the autostereoscopic 3D-display device; and in response to the detected motion transmit eye-tracker control signaling, via the eye-tracking system interface, directing the eye-tracking system to generate the additional eye-location data.

26. The display control system of claim 21, wherein the display control system is integrated within the autostereoscopic 3D-display device.

27. The display control system of claim 21, wherein the deflector control signaling directs acousto-optical deflectors to deflect the light rays, and wherein the acousto-optical deflectors use surface acoustic waves to deflect the light rays.

28. The display control system of claim 21, wherein the deflector system comprises acousto-optical deflectors and electro-optical deflectors, wherein the deflector control signaling directs the electro-optical deflectors to deflect the light rays coarsely, and wherein the deflector control signaling directs the acousto-optical deflectors to deflect the light rays finely.

29. The display control system of claim 21, wherein the deflector system comprises acousto-optical deflectors and electro-optical deflectors, wherein the deflector control signaling directs the electro-optical deflectors to deflect the light rays towards a direction associated with the first and second viewer sets of eye-locations and wherein the deflector control signaling directs the acousto-optical deflectors to deflect the light rays towards each of the first and second viewer left eye-locations and the first and second viewer right eye-locations.

30. The display control system of claim 21, wherein sequentially outputting the light rays representing the first and second viewer left-eye views and the first and second viewer right-eye views of the 3D images comprises alternating between (i) outputting the light rays representing the first and second viewer left-eye views and (ii) outputting the light rays representing the first and second viewer right-eye views.

31. A non-transitory computer-readable medium having stored thereon program instructions executable by a processor to cause an autostereoscopic 3D-display device to:

receive eye-location data indicative of a first and second viewer set of eye-locations relative to the autostereoscopic 3D-display device, wherein the first and second viewer sets of eye-locations comprises a first and second viewer left-eye location and a first and second viewer right-eye location, the received eye-location data further indicative of movement of at least one of the first or second sets of eye-locations relative to the display device;

sequentially output, from the 3D-display device, light rays representing a first and second viewer left-eye view of 3D images and light rays representing a first and second viewer right-eye view of the 3D images;

using an active sold-state optical deflector (i) to deflect the output light rays representing the first and second viewer left-eye views towards the first and second viewer left-eye locations and (ii) to deflect the output light rays representing the first and second viewer right-eye views towards the right-eye locations;

estimate a refresh time corresponding to when the display device will refresh the displayed 3D images;

estimate future eye-locations based at least in part on the indicated movement characteristics of the at least one of the first or second set of eye-locations, wherein the estimated future eye-locations correspond with an expected eye-location of at least one of the first or second eye-locations at the estimated refresh time; and deflect the output light rays towards the estimated future eye-locations at the estimated refresh time;

wherein the active sold-state optical deflector is configured to deflect the light rays representing the first viewer right-eye and left-eye views towards the first set of eye-locations such that each light ray is directed to a focused spot smaller than an eye of the first viewer to prevent the first viewer right-eye and left-eye view from being viewed by an eye of the second viewer;

wherein the light rays representing the second viewer right-eye and left-eye views are deflected towards the second viewer set of eye-locations such that each light ray is directed to a second focused spot centered on an eye of the second viewer; and wherein the second focused spot is larger than an eye of the second viewer by an amount configured to facilitate a target amount of movement of the second viewer.

32. The non-transitory computer-readable medium of claim 31, wherein the display screen comprises a lenticular display-screen.

33. The non-transitory computer-readable medium of claim 31, wherein the autostereoscopic 3D-display device comprises a mobile display-device.

34. The non-transitory computer-readable medium of claim 31, wherein deflecting the output light rays comprises using surface acoustic waves to deflect the light rays.

* * * * *